June 30, 1964 A. E. JOHANSON ETAL 3,139,596

PHASE MODULATION BY NONLINEAR VOLTAGE-SENSITIVE CAPACITOR WITH PRESERVATION OF MODULATION INDEX

Filed May 9, 1962

INVENTORS A. E. JOHANSON
T. L. POWERS

BY Harry C. Hart

ATTORNEY 3,139,596

PHASE MODULATION BY NONLINEAR VOLTAGE-SENSITIVE CAPACITOR WITH PRESERVATION OF MODULATION INDEX

Alfred E. Johanson and Thomas L. Powers, New Providence, N.J., assignors to Bell Telephone Laboratories, Incorporated, New York, N.Y., a corporation of New York Filed May 9, 1962, Ser. No. 193,521
6 Claims. (Cl. 332—30)

This invention deals with phase angle modulation of a carrier wave by a message wave. One of its objects is to provide automatic control of the modulation sensitivity in such a way as to hold the modulation index approximately constant. Another object is to accomplish the control, together with the modulation, through the agency of apparatus of the simplest character.

A convenient way in which to modulate the phase angle of a carrier wave, without at the same time modulating its amplitude, is to pass it through a network which includes an element that is varied under control of the modulating wave, the network being proportioned to interpose a transfer factor of which the phase angle varies with variations of the element while its magnitude remains unchanged. A solid state diode, when reversely biased for low conduction, is a voltage-sensitive capacitor: its capacitance at each instant depends on the voltage momentarily applied to it. Were it not for the curvature of the characteristic relating capacitance to voltage, it would serve well as the variable element in the angle-modulating network. But this curvature is so great that, for message-controlled excursions of the magnitudes commonly employed, the distortion introduced into the carrier by the modulation process would be prohibitively high. Moreover, the curvature of the characteristic and its slope are so interrelated that selection of an operating point for minimal distortion results, at the same time, in minimal sensitivity.

The invention stems from the recognition that, with a modulation characteristic of any kind, distortion is a joint consequence of curvature of the characteristic at the operating point and of the signal-controlled excursions about this operating point and that, for curvature of any specified amount, the distortion may be held within tolerable limits by restricting the excursion accordingly; i.e., the greater the curvature of the characteristic, the more narrowly must the excursions be restricted.

This restriction, of course, carries with it a corresponding restriction of the signal-representing phase deviations of the modulated wave to small angles; i.e., the index of modulation is small. But by following the modulator with a frequency multiplier or multipliers, the angular deviation is enlarged in proportion to the factor by which the carrier is raised on the frequency scale. Hence, with an initial carrier of moderate frequency, the restriction of the signal-controlled excursions to small angles is not fatal.

Once the excursions due to signals of a particular energy level have been thus held within bounds, it becomes possible, by turning to account the relation that obtains between the curvature of the characteristic at an operating point and its slope at the same point, to achieve increased sensitivity for signals of low energy level and reduced sensitivity for signals of high energy level, thus to secure an index of modulation that is approximately constant and, over an ample though restricted range, independent of signal energy. This behavior is obtained by shifting the operating point along the characteristic under control of a bias signal that is representative of the message wave envelope. Again because of the relation between curvature and slope, this advantageous result is secured without significantly increasing the distortion.

While, as a practical matter, the shift of the operating point in direct proportion to the message wave envelope provides a useful approximation to constancy of the modulation index, the invention provides, as a refinement, a bias control signal that is tailored to match the characteristic; i.e., a nonlinear relation is introduced between the message wave envelope and the bias control signal which represents it such as always to select an operating point at which the slope of the characteristic, and hence the sensitivity of the modulator, are inversely proportional to the energy level of the message wave.

The invention will be fully apprehended from the following detailed description of an illustrative embodiment thereof taken in connection with the appended drawings, in which.

Figure 1:
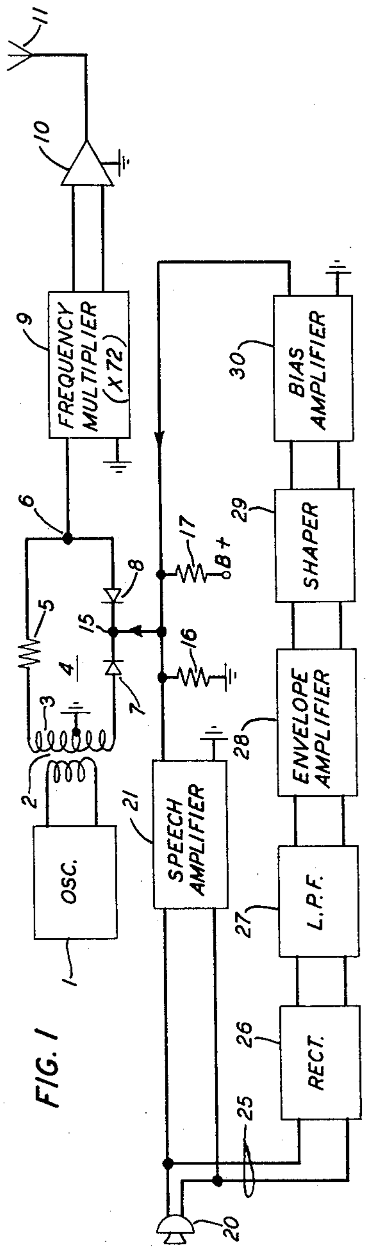
FIG. 1 is a schematic circuit diagram showing modulator apparatus embodying the invention.

Referring now to the drawings, FIG. 1 shows a source 1 of oscillations of fixed amplitude and frequency that are applied, by way of a transformer 2 of which the midpoint of the secondary winding 3 is connected to ground, a phase-shifting network 4 comprising a resistor 5 interconnecting one terminal of the secondary winding 3 with an output terminal 6 and a pair of like, oppositely poled, solid state junction diodes 7, 8 interconnecting the opposite terminal of the secondary winding 3 with the output terminal 6. The voltage which appears at the output terminal 6, originating in the source 1 and modified by the action of the phase-shifting network 4, is of the same frequency as the oscillations of the source 1, but modulated in phase in the fashion to be described below. It is raised on the frequency scale by a substantial factor, e.g., 72 times, by a frequency multiplier 9 which acts, simultaneously, to increase the phase angle deviations imposed by the network 4 by the same factor. The multiplied output is now raised to a suitable power level as by an amplifier 10 and applied to a load, e.g., to an antenna 11 for transmission by radio to a distant point.

There are available large numbers of semiconductor diodes suitable for the practice of the invention. Their characteristics differ in detail, not in general trend. Among them are the PC 117–47, manufactured by Pacific Semiconductors, Inc., and The Western Electric 420 K.

The cathodes of the two diodes 7, 8 are connected together and to a common terminal 15 which is supplied with a positive potential, e.g., by connection to a tap on a voltage divider 16, 17 extending from ground to a power supply designated B+. This potential acts both to bias the diodes 7, 8 reversely so that the conduction current which they draw is of negligible magnitude and to endow them with a certain capacitance in dependence on the magnitude of the applied voltage. For the purposes of the invention, this potential is as small as possible, consistent with the restriction that, even when a modulating signal is applied to them, the diodes always remain reversely biased. Specifically, it may be of the order of one volt or slightly less.

Figure 2:
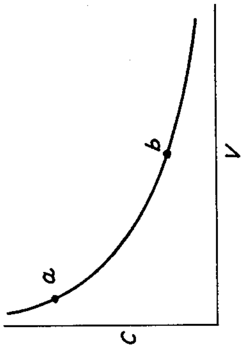
FIG. 2 is a schematic circuit diagram showing the phase-shifting network of FIG. 1.
Figure 3:
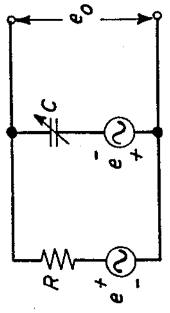
FIG. 3 is an equivalent circuit diagram of the phase-shifting network of FIG. 2.

Referring to FIG. 2, in which the diodes 7, 8 of FIG. 1 are replaced by a variable condenser C, the full voltage of the oscillation source 1 being applied to the primary winding of the transformer 2, the resulting voltage applied to the network 4, i.e., the electromotive force generated in the secondary winding 3 diminished by the impedance drop across this winding, is, for convenience, designated $2e$. One half of this voltage, developed in the upper half of the secondary winding, appears across the resistor 5 while the other half, developed in the lower half of the secondary winding, appears across the condenser C. FIG. 3 is an equivalent circuit of the network of FIG. 2 in which a generator of one polarity, representing one half of the secondary voltage is connected in series with the resistor while another generator of opposite polarity, representing the other half of the secondary voltage, is connected in series with the capacitor. From this equivalent circuit it readily appears that the voltage transfer factor of the network as a whole, from its input terminals to its output terminals is $$\frac{e_0}{e}=\frac{\frac{1}{j\omega C}-R}{\frac{1}{j\omega C}+R}=\frac{1-j\omega RC}{1+j\omega RC}=1\ \exp\ (j2\theta) \qquad (1)$$

wherein, following conventional notation, $$\left.\begin{array}{c}\omega \text{ is the angular frequency of the oscillation source,}\\ \tan\theta=-\omega RC,\text{ and}\\ j=\sqrt{-1}\end{array}\right\}(2)$$

Evidently, the magnitude of the transfer factor of the network 4 is independent of the magnitudes of $\omega$, of R and of C while its phase angle depends on all of these quantities.

Advantages, both of an impedance adjustment and of modulation sensitivity, follow from proportioning the network in such a way that, under average conditions, its reactance is approximately equal to its resistance; i.e., in such a way that $$\omega RC=1 \qquad (3)$$

Thus, by way of example, if the variable capacitance C is constituted of two Western Electric 420 K diodes connected in series and if the common terminal is provided with a bias voltage of 3 volts positive, the capacitance of each one is about 90 picofarads (90 micromicrofarads; $90\times10^{-12}$ farads). If the oscillator frequency be 12 megacycles per second, then, solving Equation 3 for the magnitude R of the resistor 5 gives $$R=\frac{1}{\omega C}=\frac{1}{2\pi(12\times10^6)\left(\frac{90}{2}\times10^{-12}\right)}=294\text{ ohms} \qquad (4)$$

Evidently this value is of convenient magnitude from the standpoints of fabrication, selection and radio frequency transmission.

Within the restriction that the polarity of the control potential V applied to the common terminal 15 is always such as to bias the diodes 7, 8 reversely, the capacitance C of any such diode is given, to a close approximation, by the relation $$C\cong\frac{1}{V^x} \qquad (5)$$

where the exponent $x$, for an alloy junction diode, is ½ and, for a diffused junction diode, closely equal to ⅓. The general trend of the characteristic represented by Equation 5 is shown, for either case, in FIG. 4. From Equation 1 it is evident that any change in the effective capacitance C produces a corresponding deviation of the phase angle of the carrier frequency oscillations as they appear at the output terminal 6 from their mean phase condition while, from Equation 5 or from FIG. 4, it appears that such a change in capacitance is produced by a corresponding change in the potential applied to the common terminal 15, the relation between applied voltage and capacitance, and hence the relation between applied voltage and carrier phase deviation, being a nonlinear one.

Figure 4:
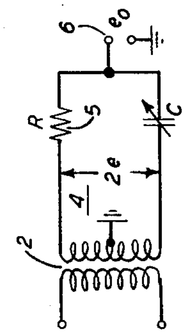
FIG. 4 is a characteristic curve relating the capacitance of a reversed biased semiconductor diode to the voltage applied to it.

In accordance with the invention the fixed bias potential, developed by the voltage divider 16, 17 and applied to the common terminal 15 is selected at a small positive magnitude such as to bias the diodes 7, 8 to a point *a* of the characteristic curve of FIG. 4. The capacitance of the diodes is now modulated by a message wave derived, for example, from a microphone 20 brought to a suitable amplitude, e.g., 1/100 volt or so, by an amplifier 21 and applied, along with the fixed bias voltage, to the common terminal 15. The voltage of this speech wave causes small excursions of the capacitance of the diodes about the opearting point *a*; so small, indeed that, for all practical purposes, each excursion follows a short straight line path having the slope of the characteristic curve at the operating point. These excursions are so small that, despite the pronounced curvature of the characteristic at the operating point, the development of distortion components in significant amounts is prevented. The small magnitude of the excursions has the consequence that the resulting deviation of the phase angle of the modulated wave from its mean value is of the order of only a few degrees. The frequency multiplier 9 connected to the output terminal 6 of the phase-shifting network 4 not only converts the oscillator frequency, illustratively 12 megacycles per second, into a frequency for transmission of 864 megacycles per second but, at the same time, converts a phase deviation of the order of one degree into a phase deviation of the order of 72 degrees. This is ample from all standpoints including the standpoint of detection, at a receiver station, of transmitted information through the agency of a conventional frequency discriminator.

It is advantageous from many standpoints to hold the index of modulation approximately constant. This is desirable in the case of a public telephone that may be actuated by loudvoices or soft ones. It is still more desirable in the case of a mobile telephone, e.g., one carried in an automobile which may travel through areas in which the ambient noise is at a high level. Experience shows that a speaker automatically adjusts the level of his voice to surmount the ambient noise, whatever it may be, and that such variations in the loudness of telephone speech may cover a range of 20 decibels. The modulation index is held approximately constant, in accordance with the invention, by arranging that an auxiliary signal derived from the voice and representative of its envelope, and hence its energy level, shall serve as a supplementary bias control for the diodes 7, 8, thus to shift their operating point from *a* on FIG. 4 for a soft voice to *b* for a loud voice. At the operating point *b* the sensitivity of the modulator, represented by the slope of the characteristic, is substantially less than at the point *a*. At the point *b* the curvature, as well as the sensitivity, is less than at the point *a*. Consequently excursions of greater extent, corresponding to the louder voice, can be tolerated without the introduction of excessive distortion. Thus, increases in the excursions about the operating point are compensated by reduction in sensitivity at the operating point, thus to hold the modulation index approximately the same for the loud voice as for the soft one and, simultaneously, because of the reduced curvature of the characteristic at the point *b*, the increased excursion is accompanied by no more distortion than was the initial small excursion for the soft voice about the point *a*.

The auxiliary signal which shifts the operating point is derived, illustratively, in an auxiliary control path 25 wherein a rectifier 26 followed by a low-pass filter 27 develops a signal of magnitude proportional to the envelope of the speech wave. The filter 27 may be proportioned to have a time constant of the order of one second or so. The envelope signal is brought to a suitable level for processing by an envelope amplifier 28. While, as a practical matter, satisfactory results can be achieved by applying the output of the envelope amplifier 28 to the diode control terminal 15 directly, the invention provides a further refinement by which the envelope signal is tailored in nonlinear fashion to offset the nonlinearity of the characteristic of FIG. 4. Evidently what is required is that, for each different speech level, the operating point selected shall be such that the slope of the characteristic at the operating point shall be inversely proportional to the speech level. In analytical terms this means that the modified enevlope signal shall bias the diodes to a point of their characteristic at which its negative derivative is inversely proportional to the signal envelope. From this requirement and Equation 5 it is readily seen that the negative derivative of the characteristic is given by $$-\frac{dC}{dV} \cong \frac{x}{V^{x+1}} \cong \frac{1}{E} \qquad (6)$$

where E is the speech wave enevlope, and hence $$V_B \cong E^{\frac{1}{x+1}} \qquad (7)$$

When, as with the alloy junction diode, the exponent is ½, Equation 7 reduces to $$V_B \cong E^{2/3} \qquad (8)$$

and when, as with the diffused junction diode, the exponent is ⅓, Equation 7 reduces to $$V_B \cong E^{3/4} \qquad (9)$$

Either of these equations is instrumented by a suitable wave shaper 29 so proportioned that its output, after amplification by an amplifier 30 to bring it to a suitable level, in combination with the initial fixed bias derived from the bias voltage divider, follows the relation of Equation 7, 8 or 9, as the case may be. Aside from the correction required to offset the fixed bias derived from the voltage divider 16, 17 the shaper may be a simple rooter to generate the ⅔ power of its input, in the case of the alloy junction diode, and the ¾ power, in the case of the diffused junction diode. A more exact tailoring may be achieved with the aid of a conventional function generator of which many varieties are available, e.g., that shown in R. V. L. Hartley Patent 2,189,898.

What is claimed is:

1. In a phase modulation system,
a source of a carrier wave of preassigned amplitude and frequency,
a load,
a phase-shift network coupled in tandem between said source and said load,
said network including a voltage-sensitive element having an impedance Z and being proportioned to present to said source a transfer ratio of which the phase angle varies in conformance with changes in the impedance of the element,
said element having a single control terminal and a nonlinear characteristic $$Z=f(V)$$

functionally relating its impedance Z to a control voltage V applied to said control terminal,
means for applying a first voltage to said control terminal to bias said element to a preassigned point of said characteristic,
a source of a message wave,
means for applying the message wave as a second voltage to said control terminal to effect minute alterations in the impedance of said element in proportion to said message wave, thereby to cause excursions of the impedance of said element about said operating point of a magnitude so small as to prevent development of distortion components of significant magnitude,
means for rectifying and filtering said message wave to provide a control signal representative of the energy level of said message wave,
means for applying said control signal to said control terminal in a sense to reduce the sensitivity of said element to said message wave voltage,
and means for frequency-multiplying the output voltage of said network together with message-wave-representative phase deviations introduced by said network.

2. In a phase modulation system,
a source of a carrier wave of preassigned amplitude and frequency,
a load,
a phase-shift network coupled in tandem between said source and said load,
said network including a voltage-sensitive element having an impedance Z and being proportioned to present to said source a complex transfer ratio of which the magnitude is substantially invariant with changes in the impedance of the element while the phase angle varies in conformance with changes in the impedance of the element,
said element having a single control terminal and a nonlinear characteristic $$Z=f(V)$$

functionally relating its impedance Z to a control voltage V applied to said control terminal,
means for applying a first voltage to said control terminal to bias said element to a preassigned point of said characteristic,
a source of a message wave,
means for applying the message wave as a second voltage to said control terminal to alter the impedance of said element in proportion to said message wave,
means for rectifying and filtering said message wave to provide an intermediate signal representative of the energy level of said message wave,
means for predistorting said intermediate signal in a fashion complementary to said nonlinear relation to provide a third control signal,
and means for applying said third control signal to said control terminal in a sense to reduce the sensitivity of said element to said message wave voltage.

3. In a phase modulation system,
a source of a carrier wave of preassigned amplitude and frequency,
a load,
a phase-shift network coupled in tandem between said source and said load,
said network including a voltage-sensitive element having an impedance Z and being proportioned to present to said source a complex transfer ratio of which the magnitude is substantially invariant with changes in the impedance of the element while the phase angle varies in conformance with changes in the impedance of the element,
said element having a single control terminal and a nonlinear characteristic $$Z=f(V)$$

functionally relating its impedance Z to a control voltage V applied to said control terminal,
means for applying a first voltage to said control terminal to bias said element to a preassigned point of said characteristic,
a source of a message wave,
means for applying the message wave as a second voltage to said control terminal to alter the impedance of said element in proportion to said message wave,
means for rectifying and filtering said message wave to provide an intermediate signal representative of the energy level of said message wave,
means for developing, from said intermediate signal, a third control signal that is related to said intermediate signal in a nonlinear fashion such as to offset the nonlinearity of said characteristic,
and means for applying said third control signal to said control terminal to bias said element to a point of its characteristic at which the slope of the characteristic is inversely proportional to the energy level of the message wave.

4. In a phase modulation system, a source of a carrier wave of preassigned amplitude and frequency, a load, a phase-shift network coupled in tandem between said source and said load, said network including a voltage-sensitive capacitor element having a capacitor C and being proportioned to present to said source a complex transfer ratio of which the magnitude is substantially invariant with changes in the capacitance of the element while the phase angle varies in conformance with changes in the capacitance of the element, said element having a single control terminal and a nonlinear characteristic $$C \cong \frac{1}{V^{x}}$$

functionally relating its capacitance C to a control voltage V applied to said control terminal, wherein the exponential $x$ is dependent on the structure of said element, means for applying a first voltage $V_1$ to said control terminal to bias said element to a preassigned point of said characteristic, a source of a message wave, means for applying the message wave as a second voltage $V_2$ to said control terminal to alter the capacitance of said element in proportion to said message wave, means for rectifying and filtering said message wave to provide an intermediate signal representative of the energy level E of said message wave, means for developing, from said intermediate signal, a third control signal $V_3$ of magnitude such that $$V_1 + V_3 \cong E^{1/(x+1)}$$

wherein the exponential $x$ is dependent on the structure of said element, and means for applying said third control signal to said control point to bias said element to a point of its characteristic at which the slope of the characteristic is inversely proportional to the energy level of the message wave.

5. Apparatus as defined in claim 4 wherein the voltage-sensitive capacitor element is a semiconductor diode having the characteristic $$C \cong V^{-1/2}$$

whereby the negative of the slope $$\frac{dC}{dV}$$

of the characteristic is $$-\frac{dC}{dV} \cong \tfrac{1}{2}V^{-3/2}$$

and wherein the third signal developing means includes a component of which the output is proportional to the two-thirds power of the input.

6. Apparatus as defined in claim 4 wherein the voltage-sensitive capacitor element is a semiconductor diode having the characteristic $$C \cong V^{-1/3}$$

whereby the negative of the slope $$\frac{dC}{dV}$$

of the characteristic is $$-\frac{dC}{dV} \cong \tfrac{1}{3}V^{-4/3}$$

and wherein the third signal developing means includes a component of which the output is proportional to the three-fourths power of the input.

References Cited in the file of this patent

UNITED STATES PATENTS

| | | |
|---|---|---|
| 2,555,959 | Curtis | June 5, 1951 |
| 2,756,328 | Braak | July 24, 1956 |
| 3,068,427 | Weinberg | Dec. 11, 1962 |